United States Patent
Cazuc et al.

(10) Patent No.: US 12,152,552 B2
(45) Date of Patent: Nov. 26, 2024

(54) FRONT FRAME AND DEFLECTION GRID OF A THRUST REVERSER OF AN AIRCRAFT NACELLE

(71) Applicant: SAFRAN NACELLES, Gonfreville-L'Orcher (FR)

(72) Inventors: Xavier Cazuc, Moissy-Cramayel (FR); Vincent Jean-Francois Peyron, Moissy-Cramayel (FR); Jean-Philippe Joret, Moissy-Cramayel (FR); Sebastien Laurent Marie Pascal, Moissy-Cramayel (FR)

(73) Assignee: SAFRAN NACELLES, Gonfreville-L'Orcher (FR)

( * ) Notice: Subject to any disclaimer, the term of this patent is extended or adjusted under 35 U.S.C. 154(b) by 62 days.

(21) Appl. No.: 17/904,572

(22) PCT Filed: Feb. 16, 2021

(86) PCT No.: PCT/FR2021/050265
§ 371 (c)(1),
(2) Date: Aug. 18, 2022

(87) PCT Pub. No.: WO2021/170934
PCT Pub. Date: Sep. 2, 2021

(65) Prior Publication Data
US 2023/0088298 A1 Mar. 23, 2023

(30) Foreign Application Priority Data
Feb. 26, 2020 (FR) ...................................... 2001902

(51) Int. Cl.
F02K 1/72 (2006.01)

(52) U.S. Cl.
CPC ............ *F02K 1/72* (2013.01); *F05D 2230/53* (2013.01); *F05D 2250/711* (2013.01); *F05D 2260/31* (2013.01)

(58) Field of Classification Search
CPC ................. F02K 1/64; F02K 1/68; F02K 1/72
See application file for complete search history.

(56) References Cited

U.S. PATENT DOCUMENTS

| 4,177,639 A | 12/1979 | Taylor |
| 2002/0007625 A1 | 1/2002 | Fournier et al. |

(Continued)

FOREIGN PATENT DOCUMENTS

| EP | 1176302 A1 | 1/2002 |
| RU | 2145672 C1 | 2/2000 |

OTHER PUBLICATIONS

International Search Report and Written Opinion received for PCT Patent Application No. PCT/FR2021/050265, mailed on May 26, 2021, 17 pages (8 pages of English Translation and 9 pages of Original Document).

*Primary Examiner* — David P. Olynick
(74) *Attorney, Agent, or Firm* — WOMBLE BOND DICKINSON (US) LLP

(57) ABSTRACT

The invention relates to an assembly (601) which comprises a front frame (602) of a thrust reverser structure of an aircraft nacelle and at least one cascade (603). The assembly is characterized in that, when the cascade is fixed to the frame, the axial distance (L) that separates the first blading (605) upstream of the cascade from a covering area (606) between the extension of the cascade and the front frame is greater than or equal to once the mean height (h) of the cascade.

12 Claims, 5 Drawing Sheets

(56) References Cited

U.S. PATENT DOCUMENTS

| | | | | |
|---|---|---|---|---|
| 2004/0159741 | A1* | 8/2004 | Sternberger | F02K 1/72 244/110 B |
| 2012/0256051 | A1* | 10/2012 | Bellanger | F02K 1/72 244/110 B |
| 2013/0092755 | A1* | 4/2013 | Aten | F02K 1/72 239/265.33 |
| 2015/0107221 | A1* | 4/2015 | Aten | F02K 1/625 60/226.2 |
| 2015/0107222 | A1* | 4/2015 | Aten | F02K 1/72 60/226.1 |
| 2020/0102908 | A1* | 4/2020 | Kelford | F02K 1/72 |

* cited by examiner

FRONT FRAME AND DEFLECTION GRID OF A THRUST REVERSER OF AN AIRCRAFT NACELLE

TECHNICAL FIELD OF THE INVENTION

The invention relates to the field of aircraft turbojet engine nacelles. In particular to the thrust reversal systems that equip these nacelles and more specifically to an assembly comprising a front frame and a plurality of deflection grids for such a thrust reversal system.

TECHNICAL BACKGROUND

The prior art comprises in particular the documents U.S. Pat. No. 4,177,639, RU-C1-2 145 672 and EP-A1-1 176 302.

The thrust reversal systems or thrust reversers are now widely used in aircraft nacelles and, in particular, in nacelles housing a double-flow turbojet engine. In a known way, such a turbojet engine generates, by means of the blades of a rotating fan, a hot air flow (referred to as primary flow) coming from a combustion chamber, and a cold air flow (referred to as secondary flow) which circulates outside the turbojet engine through an annular channel, formed between a fairing of the turbojet engine and an internal wall of the nacelle. The two air flows are then ejected out of the turbojet engine through the rear of the nacelle and thus generate a thrust.

In such a configuration, the role of a thrust reverser is, during a landing phase of the aircraft, to improve its braking capacity on the ground by redirecting forward at least one portion of the thrust generated by the turbojet engine. In particular, when the thrust reverser is in action, it obstructs the annular channel of the cold air flow (i.e., the secondary flow) and directs this flow towards the front of the nacelle, thus generating a counter-thrust.

The means implemented to redirect the flow of cold air vary according to the type of reverser. However, in all cases, the structure of a thrust reverser comprises movable covers that can be displace between, on the one hand, an extended position (also referred to as thrust reversal position) in which they open a passage in the nacelle for the diverted flow, and on the other hand, a retracted position (also referred to as the direct jet position) in which they close this passage. The covers can thus be used to activate other deflection means such as flaps. In this case, the flaps, activated by the displacement of the movable cover, obstruct, at least partly, the channel in which the secondary flow circulates.

In addition, in the case of a thrust reverser with deflection grids, the air flow is redirected by deflection grids.

FIG. 1 schematically illustrates a portion of an aircraft nacelle 101 that comprises a thrust reverser 111 according to the prior art in the thrust reversal position. The circulation of the air flow is symbolized by the arrow 109 and the terms upstream and downstream are used in the following in reference to this flow direction.

The reverser 101 comprises at least one cover 102 that is movable relative to the stationary structure 103 of the internal conduit, referred to as IFS for "Inner Fixed Structure". The cover 102 has an external wall 104 and an internal wall 105 that delimit, in a direct jet position of the turbojet engine (not shown), an external wall of the annular channel 106 through which the secondary flow flows. The reverser further comprises at least one flap 107 hingedly mounted to the movable cover 102. At least one actuator, such as a jack (not shown), slides the movable cover 102 and causes the flap or the flaps 107 to close the annular channel 106. This flap 107 diverts at least one portion of the secondary flow out of said annular channel 106 towards deflection grids 110, thus generating the counter-thrust.

The redirection of the secondary flow can thus be realized by the deflection grids 110 depending on whether they are covered or uncovered by translation of the movable cover along the axis X around which the nacelle extends. The deflection grids 110 are further arranged adjacent to each other in an annular area surrounding the annular channel 106 and comprise series of bladings 115 that extend from upstream to downstream.

The area 112 corresponds to the junction area between a stationary structure referred to as front frame 113, a deflection grid 110 and a deflection edge 114 of the thrust reverser 111. This junction area is illustrated in more detail in FIG. 2.

In the known prior art, the deflection grids 110 are attached to the casing of the turbojet engine by means of f front frame 113. An element referred to as deflection edge 114, also attached to the front frame, allows to form an aerodynamic line and direct the air flow towards the deflection grids 110 as shown in the arrow 201.

In the example shown, the most downstream segment 203 of the front frame 113 is used to allow the attachment of both the deflection grids 110 and the deflection edge 114. In addition, the deflection edge 114 comprises a curvature 205 that forms a cavity 204 in which attachment means (not shown) are housed. The deflection grids, the front frame and the deflection edge are thus attached together by common attachment means located at the level of this cavity and close to the first upstream bladings 202 of the deflection grids upstream of said bladings.

Thus, as illustrated in FIG. 2, in the known prior art, the attachment of the various elements that constitute a thrust reverser relies in particular on the existence of an axial over-length of the front frame compared to the length 206. The expression "over-length" is used here in comparison with a length inferior or equal to a threshold value 206 which would allow in particular to simplify the manufacturing process of the front frame by making its dimensions compatible with a manufacturing by simple machining of a single material block. In other words, the over-length requires a more complex and costly manufacture of the front frame.

SUMMARY OF THE INVENTION

The present invention proposes a solution allowing to limit the dimensions of the front frame to which the deflection grids are attached so as to enable to manufacture said front frame by a simple and economical manufacturing method. In addition, the invention allows to maintain aerodynamic performance of the thrust reverser at least equivalent to that of a reverser of the prior art.

To this end, according to a first aspect, the invention concerns an assembly comprising a front frame of a thrust reverser structure of an aircraft nacelle and at least one deflection grid, said assembly being annular and extending about an axis, said deflection grid comprising, upstream, a grid extension, extending radially and/or axially relative to the axis of the assembly, intended to allow the attachment of said grid to said front frame, said assembly being characterised in that, when the deflection grid is attached to the frame, the axial distance separating a first upstream blading of said deflection grid and an overlap area between the grid extension and the front frame is greater than or equal to one time an average height of the deflection grid.

The assembly according to the invention may comprise one or more of the following characteristics, taken alone from each other, or in combination with each other:
- the assembly further comprises a deflection edge attached to the front frame and configured to direct a gas flow towards the deflection grid.
- the deflection edge comprises a curvature adapted so that an end of said deflection edge overlaps with the front frame when the deflection edge is attached to said front frame.
- the deflection grid is attached to the front frame by attachment means, located in the overlap area between the grid extension and the front frame.
- the deflection grid is attached to the deflection edge by first attachment means and said deflection edge is attached, at the level of its end closest to the deflection grid, to the front frame by second attachment means different from the first attachment means.
- the deflection grid, the deflection edge and the front frame are attached to each other by common attachment means located in the overlap area between the grid extension and the front frame.
- the front frame further comprises a corner piece, adapted to allow the attachment of the deflection edge and of the deflection grid to the front frame.
- the corner piece is attached to the deflection edge by first attachment means and wherein the deflection grid is attached to the front frame by second attachment means.
- the grid extension of the deflection grid further comprises a profile, adapted to allow the attachment of the deflection grid to the deflection edge and the front frame and, when the deflection grid is attached to the front frame, the axial distance between a first upstream blading of said deflection grid and an overlap area between the profile and the front frame is greater than or equal to one time an average height of the deflection grid.
- the profile is attached to the deflection edge by first attachment means and is attached to the front frame by second attachment means.
- the attachment means used to attach the deflection grid and/or the deflection edge and/or the corner piece to the front frame are of the countersunk head and cage nut or screw and cage nut type.

BRIEF DESCRIPTION OF THE FIGURES

The invention will be better understood and other details, characteristics and advantages of the present invention will become clearer from the following description made by way of non-limiting example and with reference to the attached drawings, in which.

The elements having the same functions in the different embodiments have the same references in the figures.

DETAILED DESCRIPTION OF THE INVENTION

Figure 1:
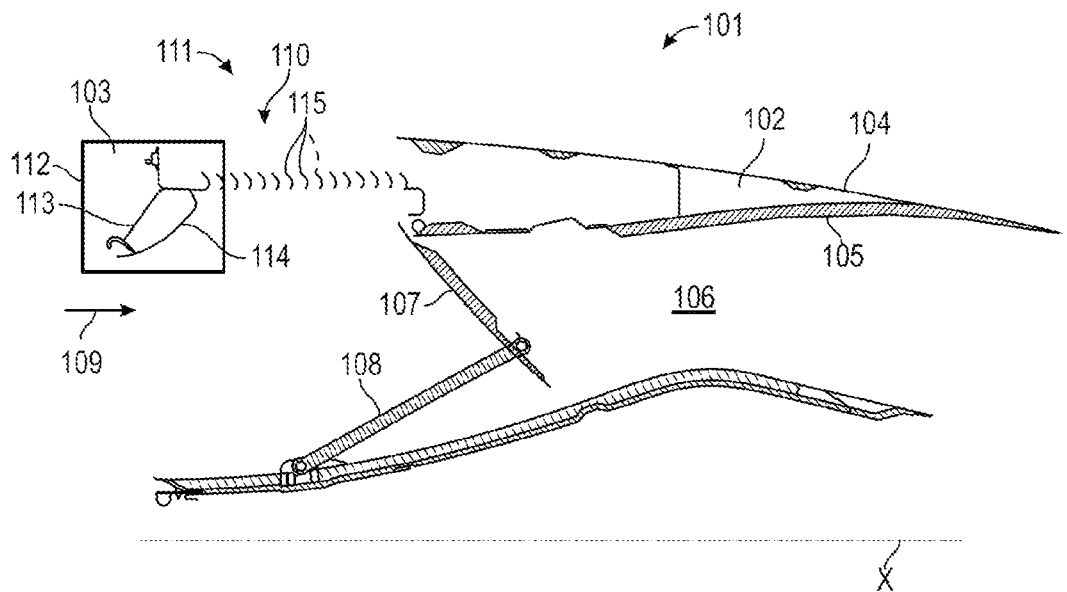
FIG. 1 is a schematic view, in longitudinal cross-section, of a thrust reverser according to the prior art in the thrust reversal position.
Figure 2:
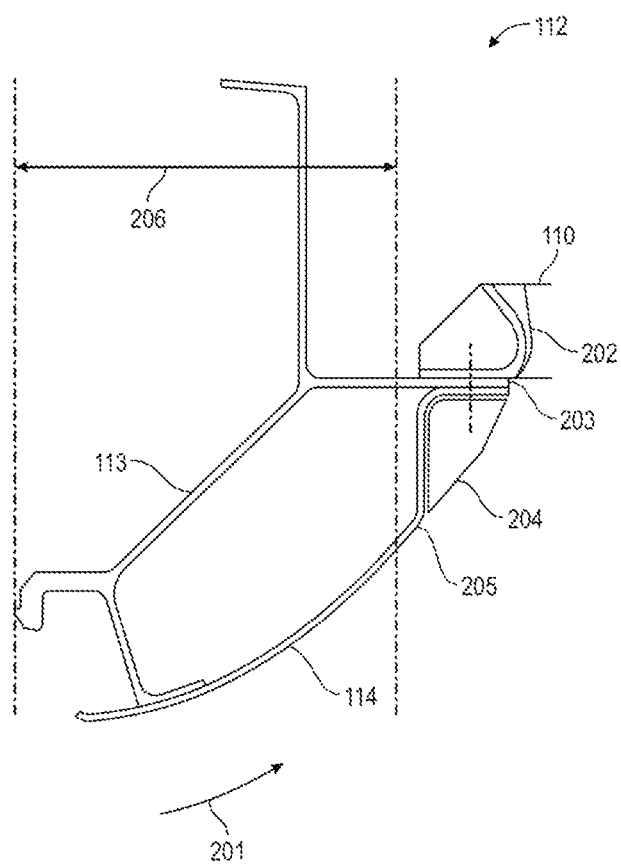
FIG. 2 is a schematic view, in longitudinal cross-section, of the junction area between a front frame, a deflection grid and a deflection edge of a thrust reverser according to the prior art.
Figure 3:
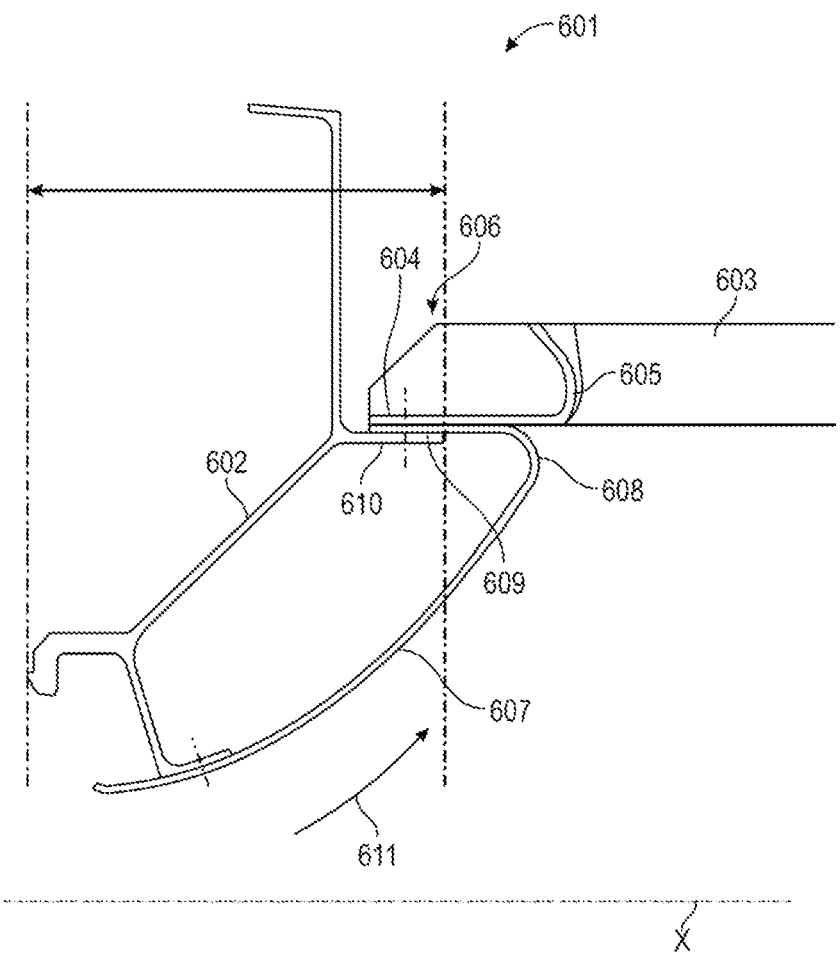
FIG. 3 is a schematic view, in longitudinal cross-section, of the junction area between a front frame, a deflection grid and a deflection edge of a thrust reverser according to a first embodiment of the invention.

With reference to FIG. 3 we will now describe a first embodiment of the invention. The assembly according to the invention can be integrated into any type of aircraft nacelle comprising a thrust reverser such as, for example, the one described above with reference to FIG. 1.

The assembly 601 comprises a front frame 602 of a thrust reverser structure of an aircraft nacelle and at least one deflection grid 603. The assembly 601 is annular and extends about the axis X. The terms axial and radial used hereafter are therefore understood to be relative to this axis. The person skilled in the art will appreciate that such an annular assembly may, in particular embodiments, comprise deflection grids that are not arranged in a continuous 360 degree angular sector. For example, there may be spaces provided between two adjacent deflection grids or some angular sectors may not comprise grids.

The deflection grid 603 comprises, upstream in the gas flow direction, a grid extension 604. The grid extension 604 corresponds to an elongated segment of the deflection grid 603 which extends axially. This extension is intended to allow the grid to be attached to the front frame. In addition, the extension allows the position of the first upstream blading 605 to remain unchanged, in the duct in which circulates the flow (in the thrust reversal position), with respect to an assembly in which the front frame would extend further downstream axially. Put another way, the upstream extension of the grid compensates for the shortening of the front frame compared to a prior art front frame.

Figure 6:
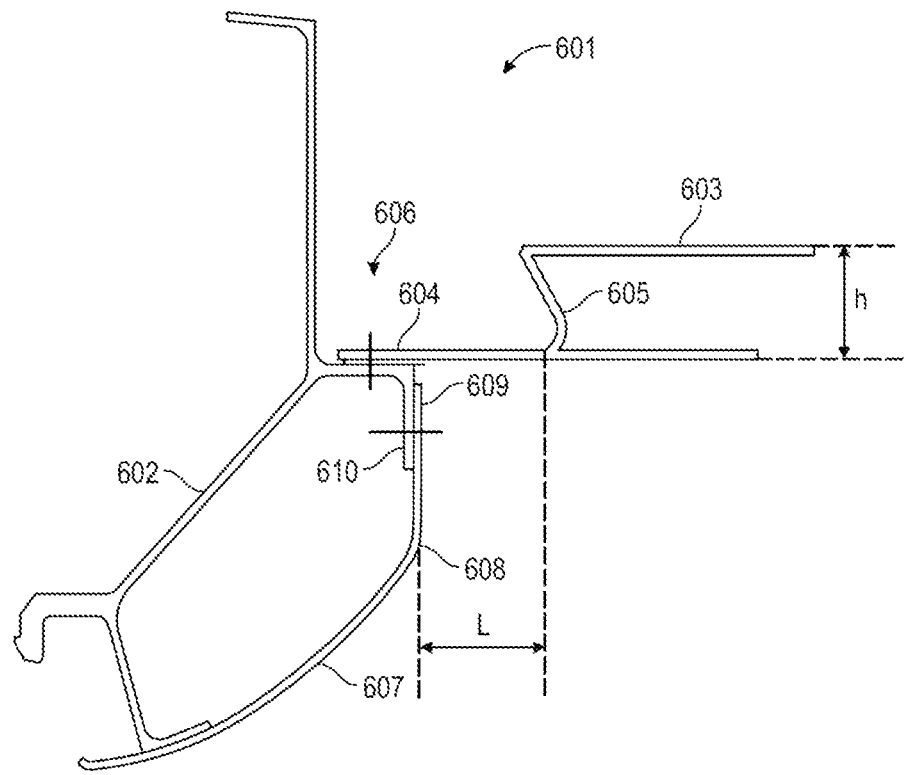
FIG. 6 is a schematic view, in longitudinal cross-section, of the junction area between a front frame, a deflection grid and a deflection edge of a thrust reverser according to a second embodiment of the invention.

Specifically, as is more clearly apparent, in FIG. 6, in all embodiments of the invention, when the deflection grid 603 is attached to the front frame, the axial distance L between the first upstream blading 605 of the deflection grid and an overlap area 606 between the grid extension and the front frame is greater than or equal to one time an average height h of the deflection grid. In particular, the axial distance L is delimited, on the one hand, upstream, by the most downstream axial station of the front frame and, on the other hand, downstream by the most upstream axial station of a root of a first channel of the deflection grid. The average height h is defined as the average, over the entire surface of the grid, of the radial distance (illustrated by the arrow in FIG. 6) between the lower face and the upper face of the grid. In addition, the height h of the grid can vary over the surface of the grid and the average can be measured in an axial and/or circumferential direction of the grid.

The term "overlap area" refers to the area in which the elements involved—in this case the grid extension and the front frame—overlap either directly or by means of a third element.

The person skilled in the art will appreciate that, in FIGS. 3, 6, 7, 8 and 9 representing different embodiments of the assembly according to the invention, the attachment means of the different elements of the assembly are not represented but their position is symbolically represented by solid lines passing through the elements attached to each other.

Figure 4:
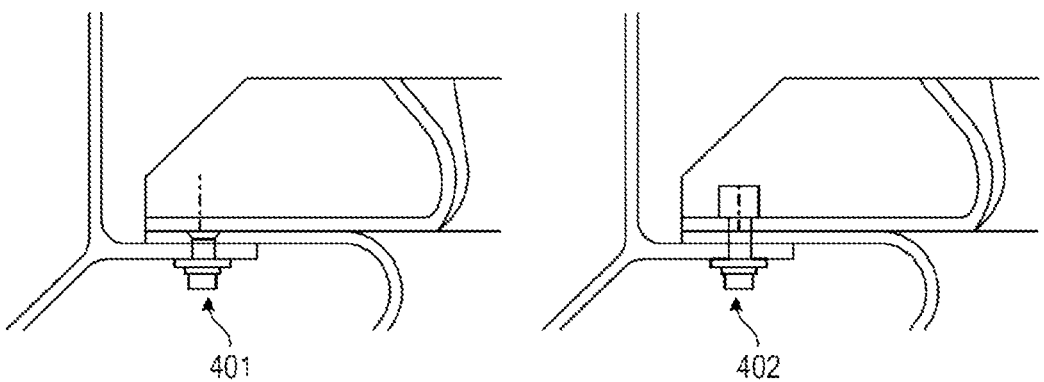
FIG. 4 is a schematic view, in longitudinal cross-section, illustrating attachment means of a deflection grid and/or a deflection edge to a front frame of a thrust reverser according to embodiments of the invention.

In addition, FIG. 4 shows, non-limiting examples of attachment means used to attach a deflection grid and/or a deflection edge and/or a corner piece (as will be described later) to the front frame. In the figure, the attachment means 401 shown on the left side of the figure are of the countersunk head and cage nut type, while the attachment means 402 shown on the right side of the figure are of the screw and cage nut type 402. Advantageously, the latter allow to transmit to the front frame the forces suffered by the deflection edge.

In the example corresponding to the embodiment described with reference to FIG. 3, the overlap area is the area where the grid extension 604 interfaces with a segment 609 of a deflection edge 607 that itself interfaces with a segment 610 of the front frame.

Indeed, in particular embodiments of the assembly, it further comprises a deflection edge that is attached to the front frame and configured to direct the gas flow towards the deflection grid. In the example shown in FIG. 3, in the thrust reversal position, the flow follows the trajectory symbolized by the arrow 611.

In addition, the deflection edge 607 comprises, in its segment that extends axially downstream of the front frame, a curvature 608 (also referred to as a return) that is adapted to cause the end (the segment) 609 of the deflection edge to overlap with the segment 610 of the front frame. Advantageously, the segment of the deflection edge that extends axially downstream of the front frame contributes to an improvement in the aerodynamic continuity of the assembly from the point of view of the flow that flows through it.

Figure 5:
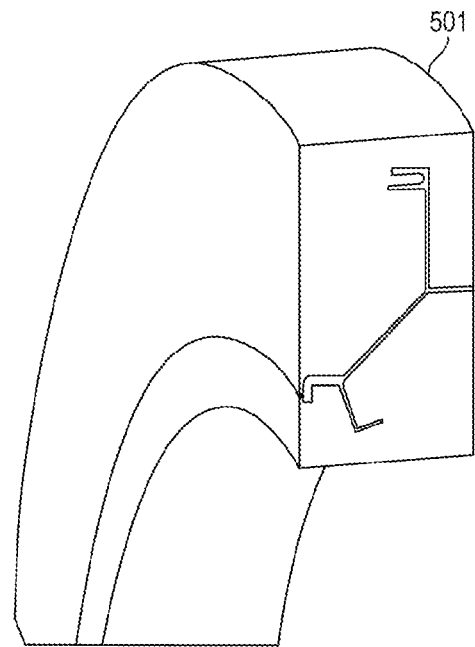
FIG. 5 is a perspective view, schematically illustrating the manufacture by machining, from a single plate of a given material, of a front frame according to the invention.

Finally, the grid extension allows the grid to be attached to a front frame shorter than a front frame from the prior art. Therefore, as illustrated in FIG. 5, a front frame angular sector (intended to be assembled with other sectors to form a complete frame) can be, for example, manufactured in a single machined part from a single block 501 (plate) of a given material. For example, aluminium 7040. In particular, it is no longer necessary to assemble two separate elements in the axial direction to manufacture this front frame angular sector.

Figure 7:
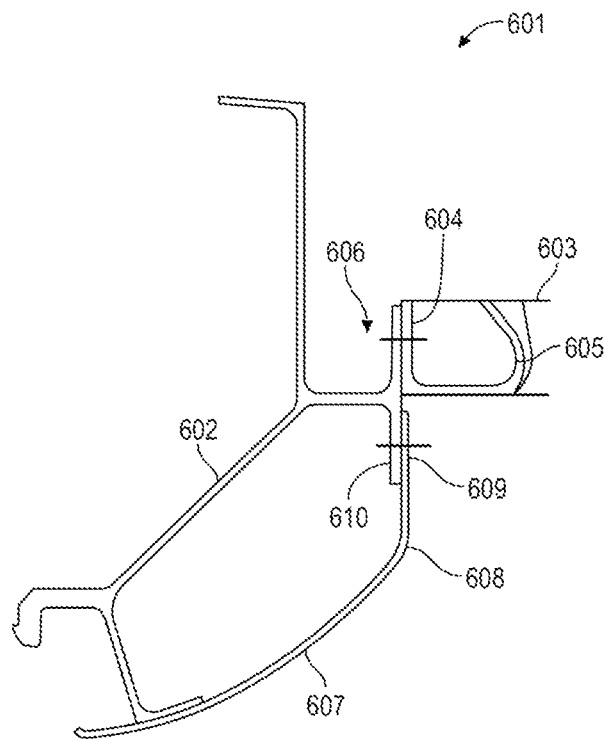
FIG. 7 is a schematic view, in longitudinal cross-section, of the junction area between a front frame, a deflection grid and a deflection edge of a thrust reverser according to a third embodiment of the invention.

In the example shown in FIG. 3, the deflection grid, the deflection edge and the front frame are attached together by common attachment means located in the overlap area between the grid extension and the front frame. FIGS. 6, 7, 8 and 9 show variants in which the different elements are attached to each other in different ways. FIGS. 6 and 7 show embodiments of the assembly comprising a front frame, a deflection grid and a deflection edge wherein the deflection grid is directly attached to the front frame, by first attachment means located in the overlap area between the grid extension and the front frame and the deflection edge is attached to the front frame, at the level of its end closest to the deflection grid, by second attachment means different from the first attachment means.

Furthermore, in the embodiment shown in FIG. 6, the grid extension extends axially upstream of the grid, whereas in the embodiment shown in FIG. 7, the grid extension extends radially and, therefore, the segment of the front frame to which it attaches also. The person skilled in the art will know how to adjust these particular arrangements to specific manufacturing, robustness and/or overall dimension constraints.

It should be noted that, in the various embodiments of the assembly, the curvature 608 of the deflection edge 607 may be greater or lesser such that the end 609 of said deflection edge forms a return upstream or extends radially in its segment intended to be attached to the front frame. Further, in the embodiment described with reference to FIG. 3, the curvature 608 allows the end 609 to be axially extended to extend upstream and interact with the grid extension and the front frame to attach these three elements together. In contrast, in the embodiments described with reference to FIGS. 6, 7, 8 and 9, the curvature 608 implies that the end 609 of the deflection edge is radially extending to allow an attachment to an inner radial extension of the front frame (i.e., in FIGS. 6 and 7), or of a fitted element (i.e., in FIGS. 8 and 9). Again, the person skilled in the art will know how to adjust the shape of the deflection edge and the shape of the segment of the front frame facing it in response to specific manufacturing and/or aerodynamic constraints, for example.

Figure 8:
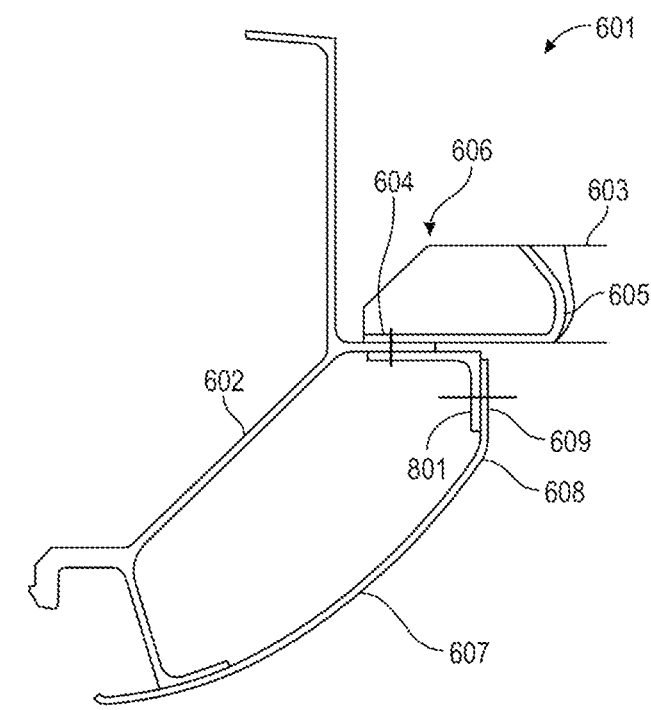
FIG. 8 is a schematic view, in longitudinal cross-section, of the junction area between a front frame, a deflection grid and a deflection edge of a thrust reverser according to a fourth embodiment of the invention; and, FIG. 9 is a schematic view, in longitudinal cross-section, of the junction area between a front frame, a deflection grid and a deflection edge of a thrust reverser according to a fifth embodiment of the invention.

In the embodiment shown with reference to FIG. 8, the front frame further comprises a corner piece that is adapted to allow the attachment of the deflection edge and of the deflection grid to the front frame. This corner piece can itself be attached to the rest of the front frame by means of common attachment means with those used to attach the deflection grid or different from them.

In the example shown in FIG. 8, the corner piece 801 is attached to the deflection edge by first attachment means and the deflection grid is attached to the front frame by second attachment means. Thus, in this particular case, the attachment of the deflection grid to the front frame is realized at the level of the overlap area 606 between the grid extension 604, the portion 602, and the corner piece 801 of the front frame.

Advantageously, the use of such a corner piece can allow, on the one hand, the reduction of the axial dimension of the front frame, and consequently, its simplified manufacture by machining a single block of material and, on the other hand, the use of deflection grids that do not require any modification compared to those of the prior art.

Figure 9:
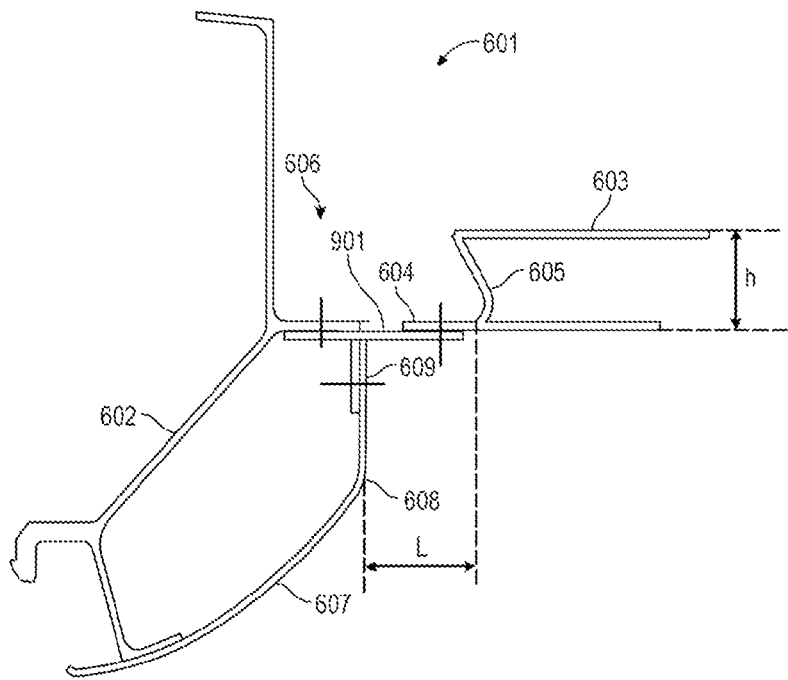

In the embodiment shown with reference to FIG. 9, the grid extension of the deflection grid further comprises a profile that is adapted to allow the attachment of the deflection grid to the deflection edge and to the front frame.

In the example shown, the profile 901 is attached to the deflection edge by first attachment means and is attached to the front frame by second attachment means. In other words, the deflection grid 603 is not directly attached to the portion 602 of the front frame but is attached to it, by means of the profile 901. Thus, in this particular case, the attachment of the deflection grid to the front frame is realized at the level of the overlap area 606 between the profile 901 and the front frame.

Advantageously, the use of such a profile can allow, on the one hand, the reduction of the axial dimension of the front frame, and consequently, its simplified manufacturing by machining a single block of material and, on the other hand, the use of deflection grids that do not require any modification compared to those of the prior art.

The invention claimed is:

1. An assembly comprising a front frame of a thrust reverser structure of an aircraft nacelle and at least one deflection grid, said assembly being annular and extending about an axis, said deflection grid comprising, upstream, a grid extension, extending radially and/or axially relative to the axis of the assembly, intended to allow an attachment of said deflection grid to said front frame, said assembly being characterised in that, when the deflection grid is attached to the front frame, an axial distance separating a first upstream blading of said deflection grid and an overlap area between the grid extension and the front frame is greater than or equal to one time an average height of the deflection grid.

2. The assembly of claim 1, further comprising a deflection edge attached to the front frame and configured to direct a flow of gas towards the deflection grid.

3. The assembly of claim 2, wherein the deflection edge comprises a curvature adapted so that an end of said deflection edge overlaps with the front frame when the deflection edge is attached to said front frame.

4. The assembly according to claim 1, wherein the deflection grid is attached to the front frame, by attachment means, located in the overlap area between the grid extension and the front frame.

5. The assembly according to claim 2, wherein the deflection grid is attached to the front frame by first attachment means and said deflection edge is attached, at a level of its end closest to the deflection grid, to the front frame by second attachment means different from the first attachment means.

6. The assembly of claim 2, wherein the deflection grid, the deflection edge, and the front frame are attached to each other by common attachment means located in the overlap area between the grid extension and the front frame.

7. The assembly according to claim 2, wherein the front frame further comprises a corner piece, adapted to allow the attachment of the deflection edge and of the deflection grid to the front frame and, when the deflection grid is attached to the front frame the axial distance between the first upstream blading of said deflection grid and the overlap area between the grid extension and said corner piece is greater than or equal to one time the average height of the deflection grid.

8. The assembly of claim 7, wherein the corner piece is attached to the deflection edge by first attachment means and wherein the deflection grid is attached to the front frame by second attachment means.

9. The assembly of claim 2, wherein the grid extension of the deflection grid further comprises a profile, adapted to allow attachment of the deflection grid to the deflection edge and to the front frame and, when the deflection grid is attached to the front frame, the axial distance between the first upstream blading of said deflection grid and the overlap area between the profile and the front frame is greater than or equal to one time the average height of the deflection grid.

10. The assembly of claim 9, wherein the profile is attached to the deflection edge by first attachment means and wherein the profile is attached to the front frame by second attachment means.

11. A thrust reverser of an aircraft nacelle comprising an assembly according to claim 1.

12. An assembly comprising a front frame of a thrust reverser structure of an aircraft nacelle and at least one deflection grid, said assembly being annular and extending about an axis, said deflection grid comprising, upstream, a grid extension, extending radially and/or axially relative to the axis of the assembly, intended to allow an attachment of said deflection grid to said front frame, said assembly being characterised in that, when the deflection grid is attached to the front frame, an axial distance separating a first upstream blading of said deflection grid and an overlap area between the grid extension and the front frame is greater than or equal to one time an average height of the deflection grid, the axial distance being delimited, on the one hand, upstream, by the most downstream axial station of the front frame and, on the other hand, downstream by the most upstream axial station of a root of a first channel of the deflection grid.

* * * * *